United States Patent Office 2,801,176
Patented July 30, 1957

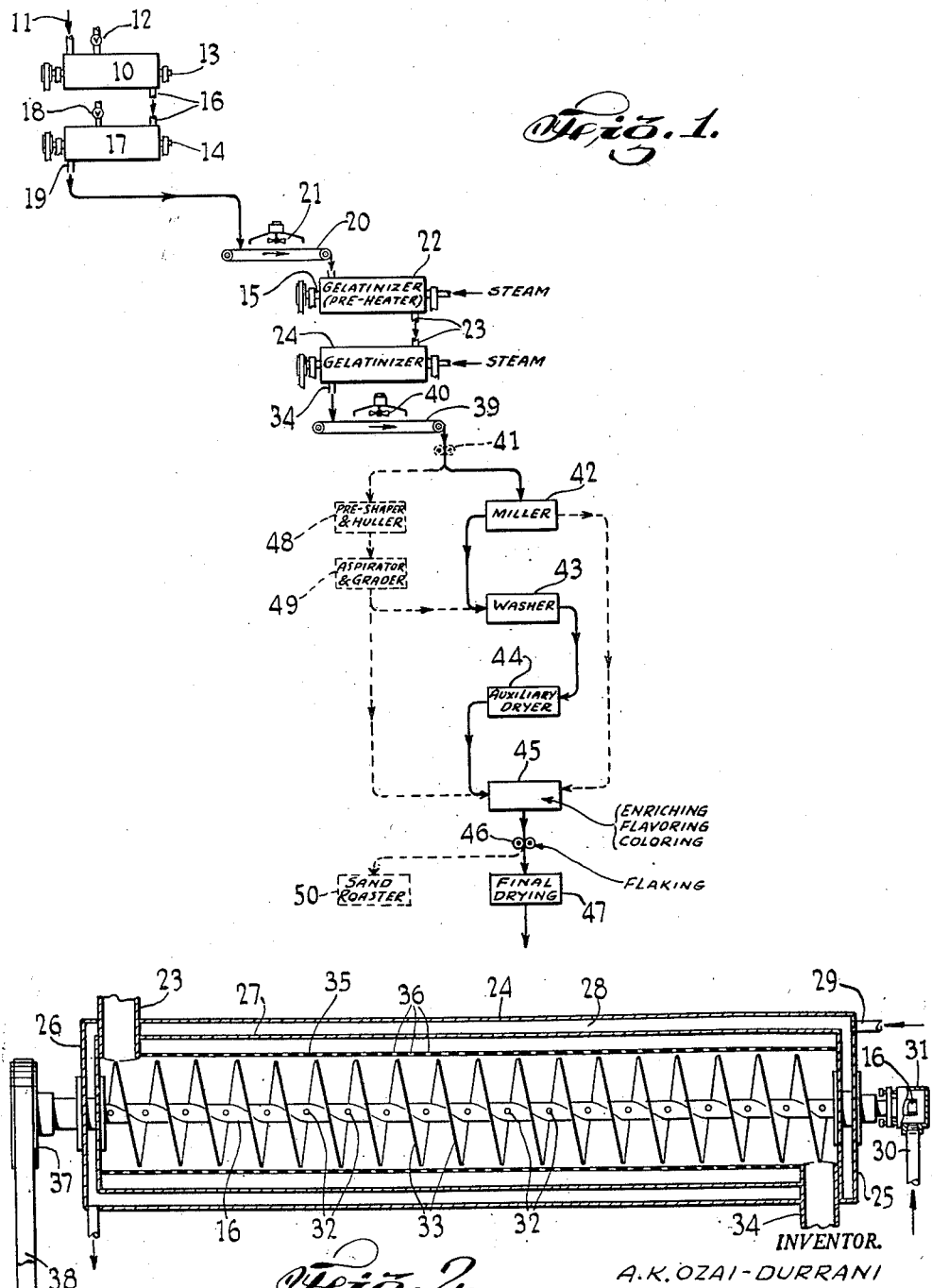

2,801,176
PREPARING READY-TO-EAT CEREAL FOODS
Ataullah K. Ozai-Durrani, Stuttgart, Ark.
Application September 10, 1953, Serial No. 379,431
18 Claims. (Cl. 99—80)

This application is a continuation-in-part of my copending application Serial No. 188,476 filed October 4, 1950, which is in turn a continuation-in-part of application Serial No. 629,864 filed November 20, 1945, now abandoned.

This invention relates to a method of preparing ready-to-eat cereal foods from whole or broken grain products of any suitable kind, such as for instance rice, wheat, oats, rye and corn and to the novel product obtained.

Cereal foods of the kind stated have been prepared heretofore from whole grain kernels, i. e., after shelling or husking the harvested, threshed and cured grain, by cooking the kernels in water under pressure or in open air, drying them to rubbery and pliable structure of a moisture content from about 15% to 30%, and shaping them by rolling, flaking, shredding, extruding, etc. The product so obtained was dried thereafter to brittle condition at a moisture content of about 5% to 14% and heat treated for puffing, toasting or roasting purposes. Seasoning or flavoring substances were frequently added in small quantities to the water for cooking the whole kernels, and sometimes also coloring material. Drying of the cooked kernels was also combined with cooling them.

These and other known methods required whole or broken kernels obtained by preceding milling of the threshed and cured grain product. Mostly the husks and bran were removed from the grains by milling; sometimes the bran was left on the kernels.

The present invention is concerned with a process in which any grain product suitable for cereal foods is treated after threshing or curing in such a manner that a ready-to-eat cereal food is obtained in a more economical and simple manner than heretofore. Consistent with this main object of the invention, it is another object to integrate with a process of curing, gelatinizing and stabilizing the threshed grain product, suitable steps for shaping it and thus to obtain a ready-to-eat cereal in the organization of a single treatment of the threshed grain product.

It is still another object of the invention to integrate with a gelatinization, hulling and stabilization process of the threshed grain product, steps for shaping and stabilizing it to form a ready-to-eat cereal.

It is still a further object of the invention to utilize the high moisture content of the gelatinized grain product, at least to a larger extent than heretofore, and the consequent rubbery and pliable consistency of the grain product for shaping and hulling it, and to stabilize its moisture content thereafter so as to obtain a ready-to-eat cereal.

It is still another object of the invention to cure and gelatinize the threshed grain product in a cautious manner so as to retain in its kernels desirable vitamins, minerals and other nutritive constituents of the unhulled grain and to shape, hull and stabilize it thereafter in such a manner that the high moisture content of the gelatinized kernels is utilized, at least to a larger extent than heretofore, in shaping the kernels so that upon stabilization of their moisture content a ready-to-eat cereal is obtained.

It is still a further object of the invention to combine with a straight forward process of obtaining a ready-to-eat cereal from the threshed and, if so desired, cured grain product, further treatments by which the storage properties of the cereal are increased, its content of nutritive constituents including vitamins, minerals, etc., enriched, and a desired flavor and/or color imparted to it.

It is also an important object of the invention to provide a novel ready-to-eat cereal food product which is relatively free from broken grains and which contains to a substantial degree the original desirable vitamin, mineral and nutritional components of the cereal.

These and other objects of the invention will be more clearly understood when the specification proceeds with reference to the drawings in which Fig. 1 illustrates a flow sheet and Fig. 2 in cross-section a gelatinizer preferred by the invention.

According to the invention, the grain product from which the cereal food is to be prepared, is cured, threshed and cleaned, or cured and cleaned after threshing; the harvested grain product is either allowed to stay on the field for a time period sufficient for drying and curing before threshing, or stored for curing in usual containers, such as bins, after threshing, or both methods are combined in conventional manner.

The grain product of a moisture content corresponding to its foregoing treatment as described above is thereafter soaked, if desired, and cooked in water and/or steamed to an extent that the moisture content of the grain product is raised to that required for gelatinization, i. e., about 34% to 35%, and that a temperature of at least 212° F. is imparted to it for a time period sufficient to effect its complete gelatinization. By this heat treatment also bacteria infestations, etc., are destroyed. The grain kernels swell and almost completely fill the hulls, and the latter open slightly in some cases.

Whereas heretofore the gelatinized grain product was cooled and dried to a moisture content of about 10% to 16% considered suitable for subsequent milling, according to the present invention the gelatinized grain product is dried either to a higher moisture content of about 17% to 24% at which its kernels remain pliable, or cooled and dried only superficially so that moisture adhering to the outer surface of the grains is removed and their sticking together prevented to a large extent whereas the moisture content of the kernels is not reduced essentially and retains a value of about 30% to 34%.

The cooled and at least superficially dried grain product of a moisture content between 17% and 24% and higher is thereafter milled. The hulling members, e. g., stones of the miller are set preferably so that only the hulls are removed whereas the bran is left on the swollen pliable kernels. The milled grain product is thereafter passed through a grader or separator in which larger hulled kernels are separated from smaller or shorter ones which are not yet hulled, and the latter are passed through another miller in which the hulling stones are set for removing the hulls from those smaller gelatinized kernels. This procedure may be repeated, if required, until practically all the grains of different size are hulled.

The cautious hulling is preferred by the invention in order to grind off the hulls only and to save the gelatinized kernels from being broken or detrimentally deformed.

According to a modification of the invention, the gelatinized grain product preferably of high moisture content is passed immediately through a shaper, comprising for instance smooth or grooved rolls set at a distance so that the hulls are rubbed off and loosened, cracked or broken off and the pliable kernels either somewhat elongated, or somewhat flattened, or given another desired preliminary shape. The grains are then placed on a conveyor or the like and passed under aspirators which remove the cracked and broken off hulls, whereupon the grain product is passed again through a shaper, the elements, such as rollers, of which are set so as to rub off, crack or break off the hulls of smaller grains and simultaneously elongate or flatten to a higher degree still pliable kernels which have been hulled in the first shaping step, and also impart a preliminary shape to the kernels which are hulled the first time. This grain product may be passed through a grader or separator, and not yet hulled grains separated from the hulled ones, and the former admixed preferably with grains to be passed through the first or second shaper. In general, two successive combined shaping and hulling operations suffice.

In this way cooked and gelatinized whole kernels are obtained with the least possible admixture of broken kernels and containing a large amount of moisture, about 17% as a minimum and preferably 22% to 26% of moisture or slightly more, and are therefore of a rubbery and still highly pliable consistency.

The kernels are thereafter treated in a washer, if so desired, for removing therefrom edible, useful or undesired oils, fats and resins which are oxidizable and therefore may become rancid upon long standing. A solvent containing petroleum fractions such as hexane, pentane, etc., proved suitable because it dissolves those oils, fats and resins contained in the grain product without removing therefrom nutritive vitamins, minerals, etc. Other washing agents, in particular dissolved soap, can be used to similar effect. Desirably, this may be accomplished by treating the kernels with hot water at a temperature of 60° or 70° C. to 100° C., and preferably between 80° and 90° C., for a period of about 30 seconds to 10 minutes. This hot water treatment, which may be conducted by hot water sprays over the kernels, removes with it much of the fats and oils from the kernels.

The washed grain product is thereafter passed through a dryer which is preferably set to remove from the surfaces of the kernels adherent remnants of the solvent or washing agent without reducing considerably or markedly their moisture content in order to preserve their rubbery or pliable consistency.

The milled, or hulled and preshaped kernels, may be flavored after washing (if any washing operation was applied), preferably by spraying upon it a flavoring mix or solution, the latter consisting, e. g., of a few percent of salt, malt syrup, sugar, etc., dissolved in water; the flavoring mix or solution is added or sprayed upon the kernels preferably in a tumbler in which they are moved rapidly. The mix or solution may also contain coloring matter. The flavoring mix will tightly adhere to the rubbery kernels, and if a flavoring solution is being used, it will be absorbed rapidly by the kernels and slightly increase their moisture content. If this increase of moisture is undesirable, the thus flavored kernels may be passed thereafter through a dryer in which the added moisture is removed again from the kernels.

Instead of a flavoring mix or solution there also may be used an enriching mixture or solution; in the latter case vitamins, edible iron compounds and other desired nutritive matter can be dissolved in a suitable liquid and volatile solvent or suspended in a suspension medium, preferably water, and a measured quantity thereof, e. g., sprayed upon the kernels the same way as a flavoring solution, and the kernels may be slightly dried thereafter if their previous moisture content is to be restored. The enriching mix, suspension or solution may also contain coloring matter.

Of course, the kernels can be treated with both a flavoring and enriching (and coloring) mix or solution, if so desired, and particularly in a single or combined process step.

The still pliable kernels are now ready for final shaping, and are passed to this effect through flattening or flaking rollers, shredding apparatus, etc., and thereafter through a dryer in which the moisture content of the finally shaped grain product is stabilized within the range of about 10% to 16% by weight of the dried product, and a ready-to-eat cereal is obtained.

The cereal product can now be stored, packed, shipped and otherwise handled. It may be toasted, roasted or puffed by the consumer. If a toasting, roasting or puffing heat treatment is to be applied to the cereal product in a plant where it is prepared, this can be done immediately after final drying, or can be combined with drying, for instance by placing the shaped, etc., kernels in a stationary or rotary oven or retort in which proper temperatures are maintained for a suitable time period, or by mixing the shaped, etc., kernels with hot sand in which proper heat is maintained until the shaped kernels are dried to the stabilized moisture content stated and also roasted.

Further details of the performance of the invention shall now be described with reference to the preparation of a ready-to-eat cereal of rice, such as roasted, toasted or puffed rice, as a representative example of grain products concerned by the invention.

In a first mode of performing the invention, paddy harvested upon maturity is shocked and left on the field for drying and curing about one or four weeks, thereafter threshed, cleaned, soaked and steamed in customary manner so as to parboil the rice and destroy enzymes, bacteria and infestations. Upon steaming, the rice kernels are gelatinized, increase in moisture by 4% to 6% and usually attain a moisture content of about 34% to 35%. The rice grains are thereafter dried so as to remove therefrom moisture adhering to the surface from the preceding steaming and, if so desired, to reduce their moisture content to about 17% to 25% and preferably 22%, at which the kernels are still of rubbery and pliable consistency. The grain product is thereafter milled in one or more steps as described hereinbefore, for removing therefrom the hulls, and handled for segregating still unhulled grains from the hulled ones. The gelatinized whole rice kernels thus recovered and still of a moisture content of between about 17% to 25% and higher are washed and/or enriched and/or flavored and/or colored in the manner described hereinbefore, then slightly dried, if so desired, in order to remove moisture added to the kernels by treating them with any solution for the purposes stated, thereafter shaped, e. g., between rollers to flakes, or shredded, etc., and then dried finally to a stabilized moisture content of about 10% to 16% and desirably 10% to 14%, whereby a ready-to-eat rice cereal is obtained. It may be roasted, toasted or puffed while it is finally dried or thereafter, and in the latter case, for instance, by the consumer.

In a second mode of performing the invention, the harvested paddy or other rough grain product is cleaned and threshed immediately after harvesting and steamed so as to gelatinize the kernels within the hulls. Thereby segregation of natural vitamin, mineral and sugar contents in the bran and polish is prevented to a large extent, and these desirable nutritive constituents are retained in the kernels and bran left thereon during subsequent milling. The threshed and cleaned grain product is preferably fed on a conveyor moving through a steam chamber filled with live steam of approximately atmospheric pressure which imparts to the grains a temperature of at least about 100° C., and the grains remain in the chamber until they have absorbed sufficient moisture from water condensed on their surfaces from the steam to increase their moisture content by 4% to 6% to complete gelatinization of their kernels. If desired, steam pressure of 5 to 15 pounds above atmospheric may be used, but desirably the ultimate temperature of the grains should be 97° to 100° C. If temperatures substantially exceeding 100° C. are avoided in the steam chamber in the manner described, caramelization of the natural sugars present in the grains and their consequent discoloring is avoided. Also a large yield of whole kernels results upon hulling subsequent to gelatinization, whereas enzymes, bacteria and infestations are destroyed. The thus gelatinized grains, and particularly parboiled rice grains are thereafter passed through a drying chamber in which warm dry air is circulated about the grains of such a temperature and for such a time period that the grains are dried superficially only, or to a lower moisture content of at least about 17% and preferably 22% to 24%. The gelatinized grains of a moisture content of about 17% to 24% and higher are thereafter hulled and washed and/or enriched and/or flavored and/or colored and, if a predetermined moisture content within the range stated is to be maintained, slightly dried, shaped to the form of the desired cereal, and finally dried to a stabilized moisture content so that a ready-to-eat cereal results.

Instead of hulling the gelatinized grains in millers of adjustments described hereinbefore, hulling of the grains and preshaping of the hulled kernels of a moisture content of about 17% to 24% and preferably 22% to 26% or 28% can be combined by passing the gelatinized and at least superficially dried grains through shaping apparatus, such as between smooth or grooved rollers which rub off or crack the hulls and also preshape the gelatinized whole kernels, as described hereinbefore. After one or more successive preshaping operations and removal of cracked off hulls for instance by aspirators, the washing, enriching, flavoring, coloring, etc., treatments are applied to the gelatinized whole kernels segregated from still unhulled grains, and the kernels are then finally shaped and finally dried to the desired stabilized moisture content whereby the ready-to-eat cereal is obtained.

As a third example of the treatment of a grain product as represented for instance by rice, may be briefly described with reference to Figs. 1 and 2 of the drawing. Paddy or another grain product harvested upon maturity is cured and threshed in customary manner, or threshed immediately after harvesting and cured or dried thereafter. The threshed and cleaned grain product of a moisture content between 10% and 16% upon curing, or of a higher moisture content up to 26% to 28% if not cured, is contacted with a measured quantity of water which the grains can still absorb at temperatures of or below about 30° C. (which do not promote enzymic actions) or at higher temperatures well below 70° C. and preferably below about 63° C. at which gelatinization sets in. This cautious soaking is effected preferably by sprinkling the quantity of water which the grains can still absorb under the temperature conditions stated, while the grains are filled into and slowly move downwardly through an upright tank or bin or seriatim through a battery of them; this measured quantity of water remains in contact with the cleaned grains for a time period between about 6 hours and one or more days; the longer the time period, the more saccharification effects are promoted resulting in sweetening of the grain product. The water forms films on the individual grains and is readily absorbed by them through the capillaries of the hulls and other coverings into the kernels. While the moisture penetrates through the hulls and coverings, it dissolves a large percentage of valuable solubles, including vitamins, minerals and salts contained in those coverings and carries them into the kernels which are thereby enriched. The thus soaked grains are almost free of surface moisture, therefore do not stick together and flow freely. Any excess water not absorbed by or adhering to the grains collects above the bottom of the tank and is drained off for use in a subsequent soaking treatment. The amount of such excess water will be incomparably less than in soaking processes heretofore used, and therefore only a small amount of solubles removed thereby from the hulls which are utilized thereafter in soaking another load of fresh grains.

The soaked grains are withdrawn from the tank or bin and freed from surface moisture by directing upon them an air blast or the like, and contain about 29% moisture. The grain product is thereafter gelatinized in a steam chamber, preferably after being preheated in a conditioner to about 60° to 70° C. The steam chamber may comprise, for instance, an upright confined space through the top of which the preheated grains are introduced so that they fall therethrough under the action of gravity, whereas steam of a temperature of about 120° to 130° C. is released into the confined space from its bottom and streams upwardly in counter-flow with the grains. By properly measuring the volume of steam per time unit and the height of the space over which the grains move downwardly, the period for which the grains are in contact with the steam within the confined space can be timed so that the grains are heated to about 100° C. (212° F.) and some water is condensed from the steam on and quickly absorbed by them; thereby their moisture content is increased by 4% to 6% or to about 34% to 35% and complete gelatinization as well as cooking of the grain product attained. The thus absorbed water penetrates through the hulls and coverings of the grains, dissolves residues of soluble constituents still in them and carries those constituents into the swelling kernels undergoing gelatinization; thereby an enriched gelatinized grain product of desired storage properties is obtained, since enzymes, bacteria and infestations are destroyed by the steaming.

A modification of the process just described consists in that the cleaned, rough grains are delivered through pipe 11 into and passed axially through a first horizontal cylinder 10, Fig. 1, and exposed therein to a stream of saturated steam admitted through inlet 12, of a volume per time unit controlled automatically or manually with respect to the quantity of the grain product moved axially through the cylinder per time unit so that the grains are heated to about 60° to 70° C. and in any event below gelatinization temperature. Thereby air contained within the hulls of the grains between their starch granules is expanded and escapes through the pores of the hulls, in general without promoting enzymic reactions due to the short time period, say about 15 to 30 minutes that the grains remain within cylinder 10. The thus "evacuated" grains are transferred through pipe 16 into another cylinder 17 in which they are contacted with cold or warm water supplied through pipe 18 and of a temperature below about 30° C. and in any event below about 60° C., and the quantity of which is measured automatically or manually preferably to equal approximately that which the "evacuated" grains can absorb without gelatinization. The grains are moved through cylinder 17 the same way as through the first one, preferably by means of paddles on belt and pulley driven shafts 13, 14 which also agitate the grains and secure their intimate contact with the steam in the first and the soaking water in the second cylinder. By "evacuating" the grains in cylinder 10, the absorption by them of soaking water in the second cylinder is greatly enhanced and accelerated and thereby the over-all time period required for soaking the grains in cylinder 17 reduced to about 15 minutes to one or a few hours. The measured quantity of soaking water can, e. g., be sprinkled upon the grains moving through cylinder 17. The soaked grains will contain about 29% moisture, and they will flow freely. Moisture adhering to the grains discharged from cylinder 17 through pipe 19 can be removed in a dryer, consisting, e. g., of a conveyor belt 20 and one or more air blowers 21.

The thus soaked grains can be discharged either into a steam chamber as described hereinbefore, or into another cylinder 22 in which the grains are preheated to about 60° to 70° C. To this effect, the grains are moved through cylinder 22 by means of paddles on a belt and pulley driven shaft 15 and a measured volume per time unit of live steam of atmospheric pressure is released into the cylinder. Cylinders provided with inlet and outlet chutes for the grain product, shafts with paddles, and automatic or manually operated means for admitting a controlled volume of steam are known in the art. The preheated grains are transferred through pipe 23 into another cylinder 24 for steaming them. While this cylinder can be of any standard construction, I prefer the one shown in the drawing. It comprises a hollow shaft 16 air tightly passed through the end walls 25, 26 of the horizontal cylinder 24 which is provided with a heating jacket 28 supplied through pipe 29 with steam under pressure which keeps the inside wall 27 of the jacket exposed to the cylinder space at a temperature well above 100° C. Steam is released into the cylinder space through pipe 30, head 31, hollow shaft 16 and holes 32 therein of a size smaller than the grains, and the temperature and volume of the steam thus released is controlled automatically or manually so that the grains moved through the cylinder by worm 33 on shaft 16 are heated to about 100° C. and sufficient water is condensed on them which water upon ready absorption through the hulls increases the moisture content of the grain kernels by 4% to 6% or to about 34% to 35%. Thereby the kernels are completely gelatinized and cooked. Since condensation of excess moisture is completely or almost completely prevented, the gelatinized grains leaving the steaming cylinder through pipe 34 will flow freely, contain a large amount of the natural nutritive constituents previously comprised by the hulls and bran, while enzymes, bacteria and infestations are destroyed.

Cylinder 35 with perforations 36 smaller than the grains prevents the latter from contacting the hot wall 27 whereas water condensing from the steam drops through the perforations onto wall 27 and is evaporated again. Pulley 37 and belt 38 drive shaft 16 at desired speed.

The thus gelatinized grains are either dried superficially only on conveyor belt 39, Fig. 1, by air blower or blowers 40 or to lower moisture content above the one heretofore considered suitable for milling, preferably in a customary dryer and to a moisture content between about 17% to 24%. However, mere removal of surface moisture can suffice for the subsequent treatment according to the invention.

In this as well as in all the previous examples, at least the superficially dried grain product can be run through breaking rolls 41, Fig. 1, which separate gelatinized grains which accidentally stick together and which accidentally stick together and which straighten out deformed grains.

The gelatinized grain product is thereafter milled in miller 42 and the whole kernels are washed in washer 43, superficially dried in auxiliary dryer 44, enriched and/or flavored and/or colored, etc., by spraying upon it a suitable solution or mixture in tumbler 45. A mix sprayed upon the still rubbery kernels sticks tightly to them, whereas a solution is quickly absorbed. Thereafter the kernels which are still of a preferred moisture content of about 17% to 26% or 28% and therefore pliable, are shaped, for instance flaked by flaking rolls 46, and finally dried in dryer 47 to a stabilized moisture content of about 10% to 16% and preferably about 13% to 14% suitable for storing, packing and shipping. In case the washing step is to be omitted, the hulled gelatinized kernels are delivered directly from miller 42 into the enriching, etc., apparatus 45, as indicated in dotted lines.

If the modification of the invention is used according to which the gelatinized grain product is preshaped and simultaneously its hulls are rubbed off or cracked, the grain product is passed from the breaking rollers 41 to a preshaping and hulling apparatus 48 in which smooth or grooved rolls are used of an adjustment and effect described hereinbefore, and the preshaped and hulled kernels as well as unhulled grains of smaller size are delivered to an aspirator and grader 49 which removes cracked hulls by aspiration and separates hulled gelatinized kernels from still unhulled smaller gelatinized grains in the manner hereinbefore described; only one such preshaping and hulling apparatus as well as one aspirating and separating apparatus is shown in Fig. 1 for the sake of simplicity. The preshaped and hulled kernels are then delivered either to washer 43 and treated thereafter in the same way as hulled kernels delivered from miller 42, or delivered directly to the enriching, etc., apparatus 45 if an enriching, etc., operation is desired; in any event the still pliable preshaped kernels of a moisture content of about 17% to 34% are finally shaped, such as flaked and finally dried.

If final drying to a stabilized moisture content and roasting, toasting or puffing, etc., are to be combined, the shaped, for instance flaked kernels are delivered to a rotary or stationary roasting, etc., apparatus, in the exemplification of Fig. 1 to a sand roaster 50.

Whether the finally shaped kernels be only dried thereafter or dried and roasted, etc., in any event a ready-to-eat cereal is obtained in an entire process in which all the operations for treating the threshed and cleaned grain product, i. e., gelatinizing, hulling, shaping and final drying are integrated and which therefore is highly economical, requires the least equipment and utilizes to large extent the moisture content of the gelatinized grain product for shaping its kernels to the desired ready-to-eat cereal.

The effect of the process can further be increased if moisture is removed from the gelatinized kernels by exposing them to cold or hot drying air, by treating the latter in an apparatus for condensing from it volatile nutritive matter which may have been removed from the kernels with the moisture. This condensed matter can be recirculated into the water used for soaking and/or gelatinizing fresh grain products. If for similar purposes water is recirculated which has been used for soaking or gelatinizing the grain product but was not heated to 100° C. and higher so as to destroy bacteria, etc., contained therein from the treated grain product, such water can be treated before recirculation for destroying those bacteria, etc., by a pasteurizing or other sterilization process, such as treating the water with chlorine.

If the foregoing specification and appended claims reference is made to certain moisture contents of the grain product, it should be understood that the hulls contain relatively smaller and the kernels relatively larger portions of the moisture, and the percentages stated therefor refer to the average moisture content by weight of the grain product including its hulls. Where reference is made to the moisture content of the dried kernels, the average percentage of moisture by weight of the kernels is meant. Where reference is made to a moisture content of the hulled or whole gelatinized and pliable kernels, before and while they are shaped and before they are finally dried to a stabilized moisture content, it should be understood that a high moisture content is concerned, about 17% by weight of the hulled or whole kernels as a minimum at which they are pliable for easy shaping and of a rubbery consistency so that for instance a dry mixture of enriching, flavoring, etc., matter can firmly adhere to and be pressed into them upon shaping; on the other hand, such a high moisture content as would result in a mushy state of the whole kernels so that they stick together and form a shapeless mass, is excluded.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A method of preparing a ready-to-eat cereal food from a threshed and cleaned grain product, including the steps of gelatinizing the grain product at a temperature of about 100° C. in the presence of sufficient moisture to increase the moisture content thereof by about 4% to 6%, drying the resulting gelatinized grain product to effect a reduction in the moisture content thereof but not below about 17%, hulling said grain product, applying to the hulled gelatinized kernels of pliable consistency thus obtained a final shape corresponding to that desired in the cereal, and drying thereafter said shaped kernels to a stabilized moisture content between about 10% and 16% so that a ready-to-eat cereal food is obtained.

2. A method of preparing a ready-to-eat cereal food from a threshed and cleaned grain product, including the steps of gelatinizing the grain product at at least about 100° C. in the presence of sufficient moisture to increase the moisture content to about 35%, removing from the gelatinized grain product at least the moisture adhering to the surfaces of the grains from said gelatinizing process to reduce the moisture content to between about 17% and about 34% moisture, hulling said grain product, applying to the hulled gelatinized kernels of pliable consistency thus obtained a final shape corresponding to that desired in the cereal, and drying thereafter said shaped kernels to a stabilized moisture content between about 10% and 16% so that a ready-to-eat cereal food is obtained.

3. A method of preparing a ready-to-eat cereal food from a threshed and cleaned grain product, including the steps of soaking at a temperature between room temperature and about 70° C. and thereafter gelatinizing the grain product at at least about 100° C. in the presence of sufficient moisture to increase the moisture content to about 35%, removing from the gelatinized grain products at least the moisture adhering to the surfaces of the grains from said gelatinizing process to reduce the moisture content to between about 17% and about 34% moisture, preshaping said grain product and simultaneously loosening its hulls, removing the loosened hulls, applying thereafter to the preshaped kernels of pliable consistency thus obtained a final shape corresponding to that desired in the cereal and drying said finally shaped kernels to a stabilized moisture content between about 10% and 16% so that a ready-to-eat cereal food is obtained.

4. A method of preparing a ready-to-eat cereal food from a threshed and cleaned grain product, including the steps of soaking at a temperature between room temperature and about 70° C. and thereafter gelatinizing the grain product at at least about 100° C. in the presence of sufficient moisture to increase the moisture content to about 35%, cooling the gelatinized grain product and removing therefrom at least the moisture adhering to the surfaces of the grains from said gelatinizing process to reduce the moisture content to between about 17% and 34% moisture, preshaping said grain product and simultaneously loosening its hulls, removing the loosened hulls, applying to the preshaped kernels of pliable consistency thus obtained a final shape corresponding to that desired in the cereal, and drying said finally shaped kernels to a stabilized moisture content between about 10% and 16% so that a ready-to-eat cereal food is obtained.

5. A method of preparing a ready-to-eat cereal food from a threshed and cleaned grain product, including the steps of soaking at a temperature between room temperature and about 70° C. and thereafter gelatinizing the grain product at at least about 100° C. in the presence of sufficient moisture to increase the moisture content to about 35%, cooling the gelatinized grain product and removing therefrom at least the moisture adhering to the surfaces of the grains from said gelatinizing process to reduce the moisture content to between about 17% and 34% moisture, preshaping said grain product and simultaneously loosening its hulls, removing the loosened hulls, treating and thereafter applying to the preshaped and treated kernels of still pliable consistency thus obtained a final shape corresponding to that desired in the cereal, and drying said finally shaped kernels to a stabilized moisture content between about 10% and 16% so that a ready-to-eat cereal food is obtained.

6. In a method as set forth in claim 2, soaking the cleaned grain product before gelatinizing it, at a temperature between room temperature and about 70° C. with a measured quantity of moisture equaling approximately the maximum amount which the grain product can absorb at the soaking temperature.

7. In a method as set forth in claim 2, gelatinizing the grain product at at least about 100° C. in the presence of moisture measured to equal approximately the maximum amount which the grain product can absorb at the gelatinization temperature.

8. A method of preparing a ready-to-eat cereal food from a threshed and cleaned grain product in accordance with claim 1, in which the threshed and cleaned grain product is threshed and cleaned rice paddy.

9. A method of preparing a ready-to-eat cereal food from a threshed and cleaned grain product in accordance with claim 2, in which the threshed and cleaned grain product is threshed and cleaned rice paddy.

10. A method of preparing a ready-to-eat cereal food from a threshed and cleaned grain product in accordance with claim 3, in which the threshed and cleaned grain product is threshed and cleaned rice paddy.

11. A method of preparing a ready-to-eat cereal food from a threshed and cleaned grain product in accordance with claim 4, in which the threshed and cleaned grain product is threshed and cleaned rice paddy.

12. A method of preparing a ready-to-eat cereal food from a threshed and cleaned grain product in accordance with claim 5, in which the threshed and cleaned grain product is threshed and cleaned rice paddy.

13. A method of preparing a ready-to-eat cereal food from a threshed and cleaned grain product in accordance with claim 6, in which the threshed and cleaned grain product is threshed and cleaned rice paddy.

14. A method of preparing a ready-to-eat cereal food from a threshed and cleaned grain product in accordance with claim 7, in which the threshed and cleaned grain product is threshed and cleaned rice paddy.

15. A method as set forth in claim 2, wherein the hulled gelatinized kernels are treated with hot water to remove fats and oils from the kernels.

16. A method as set forth in claim 2, wherein the hulled gelatinized kernels are treated with hot water sprays at a temperature of between 60° and 100° C. to remove fats and oils from the kernels.

17. A ready-to-eat cereal food prepared by the method defined in claim 2.

18. A ready-to-eat cereal food prepared by the method defined in claim 3.

References Cited in the file of this patent

UNITED STATES PATENTS

| Number | Name | Date |
|---|---|---|
| 400,835 | Donelson | Apr. 2, 1889 |
| 1,364,912 | Baumgartner | Jan. 11, 1921 |
| 1,377,125 | Gurjar | May 3, 1921 |
| 1,832,813 | Luke | Nov. 17, 1931 |
| 2,021,721 | Gibbon | Nov. 19, 1935 |
| 2,064,701 | Stokkebye | Dec. 15, 1936 |
| 2,295,116 | Kellogg | Sept. 8, 1942 |
| 2,358,251 | Huzenlaub et al. | Sept. 12, 1944 |